Figure 7:
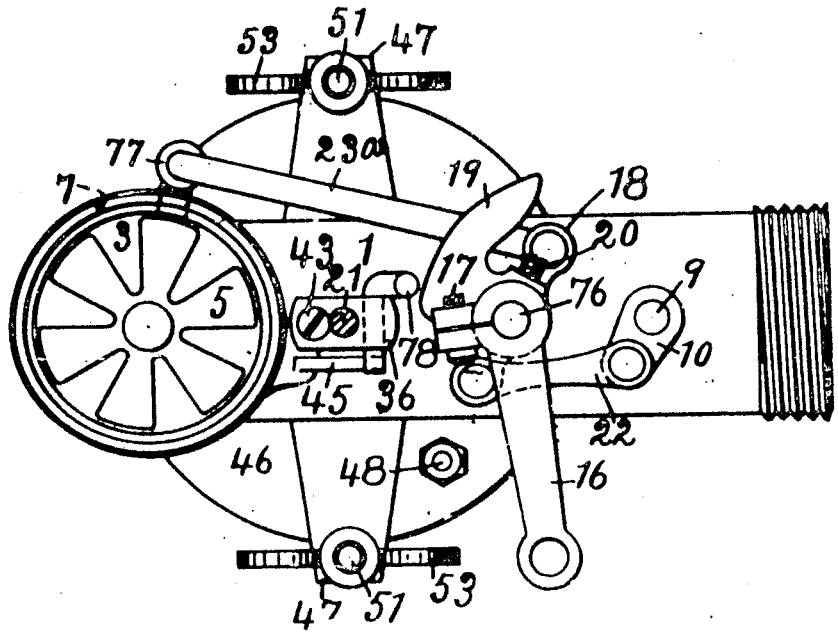

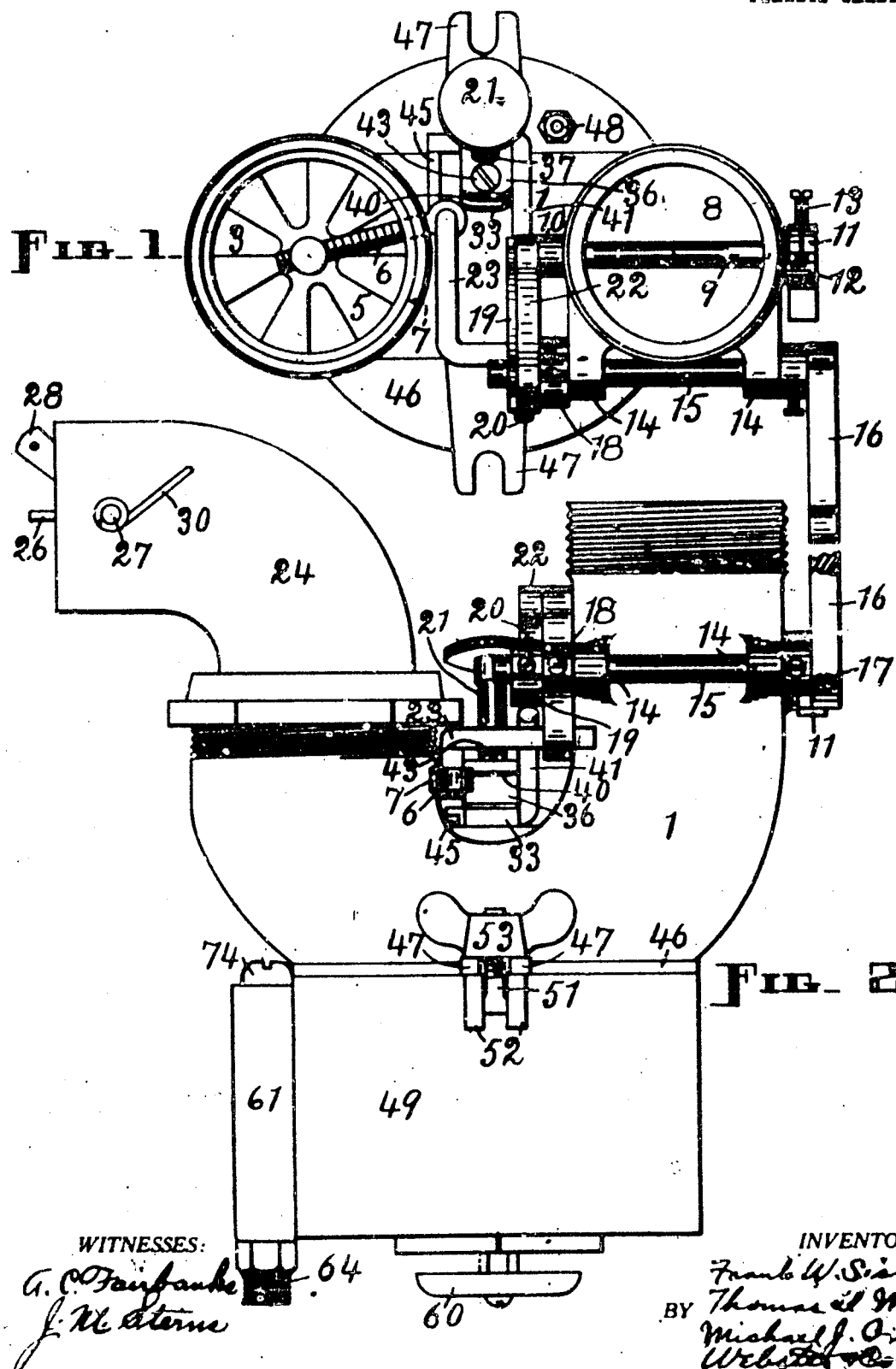

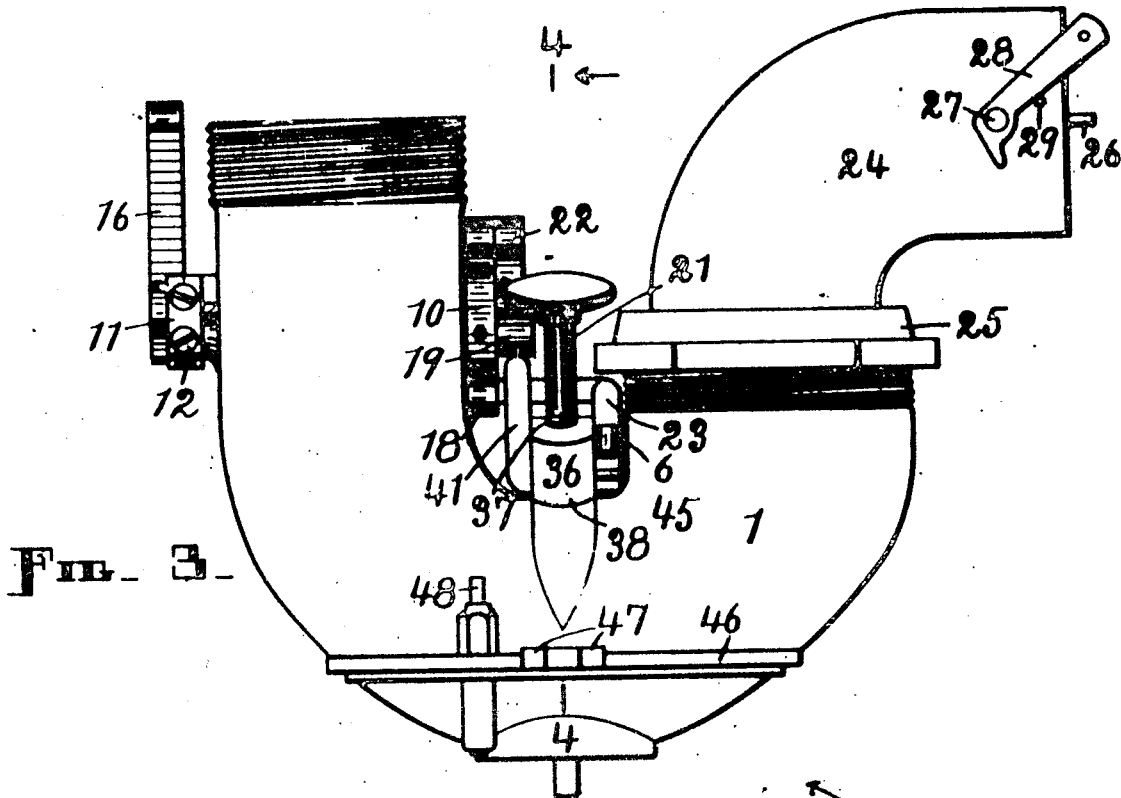
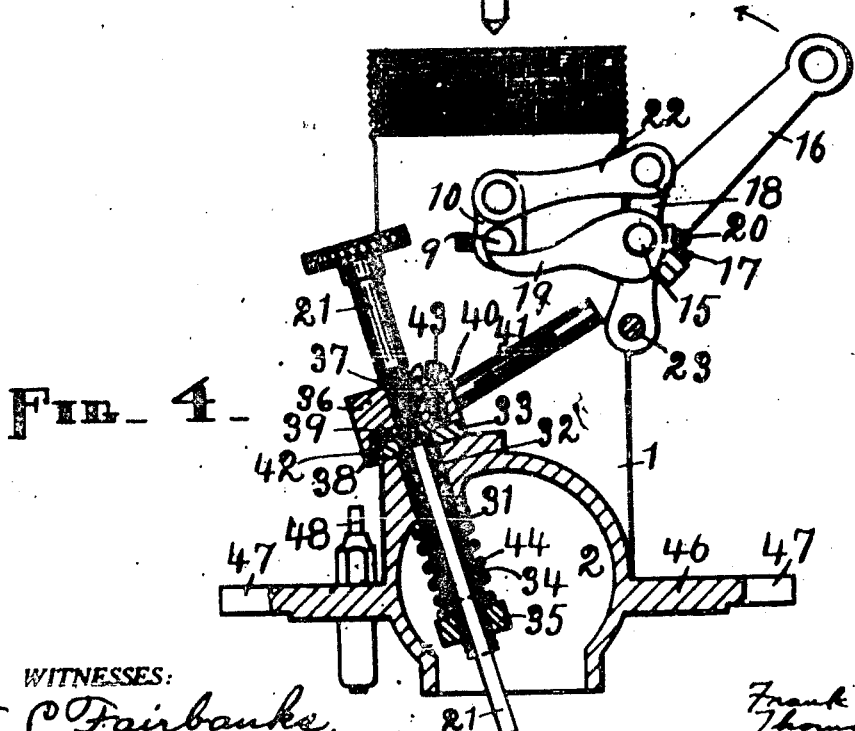

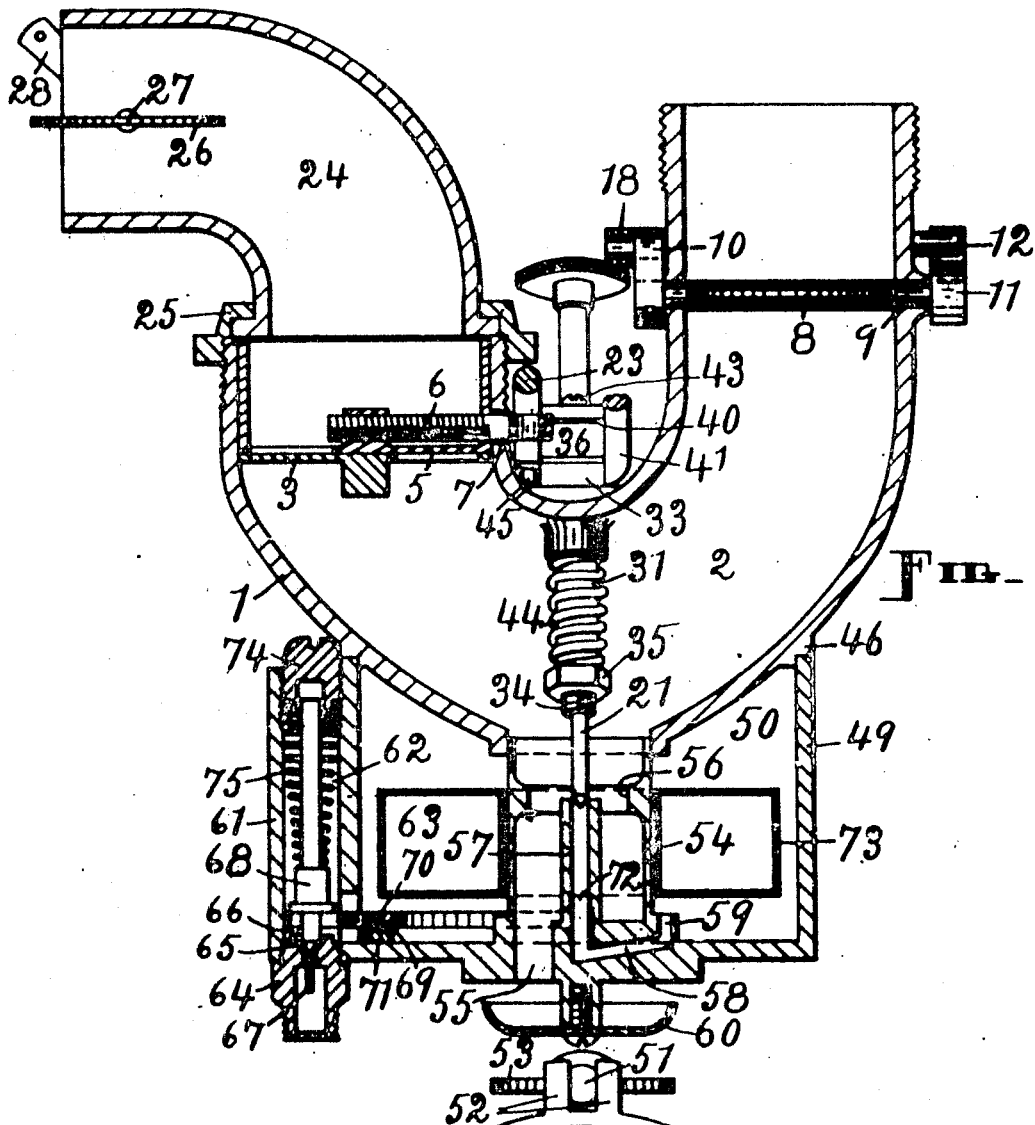
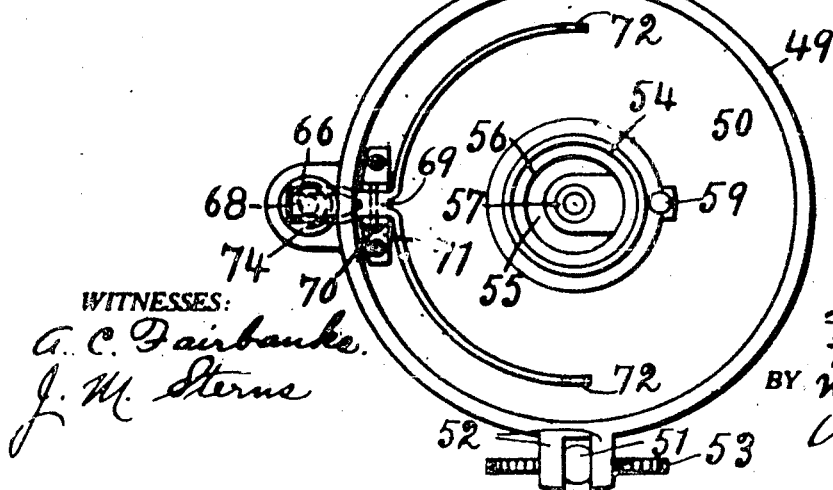

F. W. SICKLES, T. D. MILLEA & M. J. CARROLL.
CARBURETER.
APPLICATION FILED AUG. 17, 1908.

955,292.

Patented Apr. 19, 1910.
4 SHEETS—SHEET 4.

WITNESSES:
A. C. Fairbanks
J. M. Sterns

INVENTORS
Frank W. Sickles,
BY Thomas D. Millea,
Michael J. Carroll
Webster & Co.,
ATTORNEYS

UNITED STATES PATENT OFFICE.

FRANK W. SICKLES, OF HARTFORD, CONNECTICUT, AND THOMAS D. MILLEA AND MICHAEL J. CARROLL, OF SPRINGFIELD, MASSACHUSETTS, ASSIGNORS TO SIBO-CARBURETER MANUFACTURING COMPANY, OF SPRINGFIELD, MASSACHUSETTS, A BODY CORPORATE OF MASSACHUSETTS.

CARBURETER.

955,292.

Specification of Letters Patent.  Patented Apr. 19, 1910.

Application filed August 17, 1908.  Serial No. 448,832.

*To all whom it may concern:*

Be it known that we, FRANK W. SICKLES, a resident of Hartford, in the county of Hartford and State of Connecticut, THOMAS D. MILLEA, a resident of Springfield, in the county of Hampden and State of Massachusetts, and MICHAEL J. CARROLL, also a resident of said Springfield, Massachusetts, all citizens of the United States of America, have invented a new and useful Carbureter, of which the following is a specification.

Our invention relates to improvements in carbureters designed to be employed in connection with gasolene engines, in which the mixing-chamber, in the form of a tube having an elbow therein, is suitably imposed on a float-chamber and is provided with a throttle at one end and an auxiliary or supplementary air valve at the other end and with an intermediate needle-valve, and in which the constant tube in said float-chamber and the spray nozzle in said tube empty into the bottom of said mixing-chamber; these together with certain peculiar mechanism for simultaneously operating said throttle and said supplementary air valve and for operating also said needle-valve all from a single point which has independent connections with the several valves, the arrangement being such that the needle-valve usually is acted upon by the aforesaid mechanism only during the time that the other two valves, that is, the throttle and the supplementary air valve, are open to some extent at least, and with such auxiliary and subsidiary parts and combinations of parts as may be required, enter into the *ensemble* of said invention, all as hereinafter set forth.

The objects of our invention are, first, to produce a compact, durable, and comparatively simple carbureter both in construction and operation, the use of which greatly increases the reliability, efficiency, and horse-power of the gasolene engine with which it is connected, and at the same time cuts down to a minimum the amount of liquid fuel required to run such engine; second, to provide a carbureter of this kind with adequate means of adjustment so that it is adaptable to almost any engine, is reliable under all atmospheric conditions, and is capable of meeting all speed requirements; third, to furnish a carbureter with means for increasing and decreasing the amount of liquid fuel taken into or admitted to the mixing-chamber therein as required for the proper mingling of said fuel with an increasing or decreasing amount of air to form a mixture of the right proportions and having the necessary degree of richness at any point of the throttle; fourth, to enhance the control of both the intake and outgo of the liquid fuel, and insure the combination of the same to the best advantage with the primary air at the outlet point and the proper distribution thereof at such point, and, fifth, to insure means for simultaneously actuating the throttle, the supplementary air valve and the needle-valve, the latter, however, not necessarily being operated during the entire time of the operation of said throttle and supplementary air valve. These carbureters are made in two styles, a vertical and a horizontal, but substantially the same elements enter into the construction of each and there is no material difference so far as our invention is concerned between them.

We attain the objects above pointed out by the mechanism and means illustrated in the accompanying drawings, in which—

Figure 8:
Figure 9:
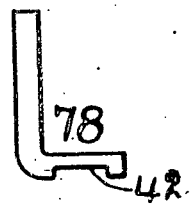

Figure 1 is a plan view of the upper section, without the supplementary air hood, of a carbureter of the vertical type which embodies a preferred form of our invention, the throttle and the supplementary air valve being shown closed in this as in the other views where they appear; Fig. 2, a side elevation of said carbureter complete; Fig. 3, a side elevation of the aforesaid upper section, including said hood, looking at the side opposite that shown in the preceding view; Fig. 4, a cross-section taken on lines 4—4, looking in the direction of the arrow, in Fig. 3; Fig. 5, a central, longitudinal, vertical section through the complete device as it stands in Fig. 2; Fig. 6, a plan view of the lower section, the float having been removed; Fig. 7, a plan view, without the hood, of a carbureter of the horizontal type which embodies a preferred form of our invention as applied to this type, the top of the needle-valve being broken off; Fig. 8, an elevation of the needle-valve lifter employed in the vertical carbureter, and, Fig. 9, an elevation of the corresponding member employed in the horizontal carbureter.

Similar figures refer to similar parts throughout the several views.

Before taking up in detail the description of our invention as illustrated in the drawings, it should be stated that said invention is susceptible to a great variety of minor structural changes, but these changes are not of a nature to affect the principle of the invention, and this application would be needlessly incumbered if an attempt were made to include specifically and in detail the same herein; such changes merely call for the exercise of the ordinary skill of the workman in adapting the invention to different conditions without departing from the general construction and mode of operation. The modifications required to adapt the valve-operating mechanism of the vertical carbureter to the horizontal carbureter afford good examples of what is meant by the foregoing.

Passing now to the consideration of a carbureter of the so-called vertical type we will proceed to describe the same fully.

A U-shaped tube is provided, in which is the mixing-chamber 2 of the carbureter, such chamber opening at the bottom in the center of the elbow to receive the fluid and the primary air supplies, at one end to receive the auxiliary or supplementary air supply, and at the other end to afford an outlet for the fuel mixture. Across the supplementary-air-inlet end of the tube 1 is a horizontal, perforated diaphragm 3, and above this diaphragm is a perforated, rotary shutter or valve 5, such valve being capable of opening and closing the perforations in the diaphragm below. The valve 5 is for the auxiliary, secondary or supplementary air which enters the mixing-chamber 2 to mingle, unite or combine with the vapor which is admitted to such chamber at the bottom. The valve 5 is represented as being in the form of an open-top cylinder having a perforated bottom. An operating arm 6 for the valve 5 passes through the side and hub of said valve after passing through a slot 7 in the side of that branch of the tube 1 in which this valve is situated. The exposed head of the arm 6 is above the elbow of the tube. In the opposite end of the tube, that is, the end opposite the valve 5, which is the outlet or discharge end, is a throttle valve 8, herein termed a throttle simply. Such throttle is attached to a horizontal shaft 9 mounted to rotate in the tube 1. The shaft 9 protrudes at both ends beyond the branch of the tube in which it is mounted, and tight on the protruding ends thereof are a shank 10 and an angular stop-dog 11, the former being on the end which is over the elbow of said tube. The arms of the stop-dog 11 stand at right-angles to each other, and the movement of said dog is limited by such arms and a lug 12 which projects from the adjacent part of the tube 1, the arrangement being such that when one arm contacts with said lug the throttle 8 assumes its closed position, and when the other arm contacts with said lug said throttle assumes its wide open position at right-angles to said closed position. A screw 13 in the stop-dog may be so adjusted as to strike the lug 12, in place of the arm which is the closing stop for the throttle, and thus prevent the complete closing of the latter. This adjustable feature is used at such times as it is not desired to shut off entirely the fuel from the engine. It may be noted in this connection that the end of the tube 1 in which the throttle is placed in practice communicates with the cylinder or cylinders of the engine with which the carbureter is associated, the contents of the mixing-chamber 2 being sucked through the outlet from said tube, when the throttle is open, by the piston or pistons in such cylinder or cylinders.

Loosely mounted parallel with the throttle shaft 9 in lugs 14—14 on the outside of the same branch of the tube 1 which carries said shaft is an operating rock-shaft 15 having an operating arm 16 held subject to adjustment by means of a screw 17 on the end of said rock-shaft which is adjacent to the stop-dog 11 and having a cross-arm 18 tight on the opposite end. A cam 19 is adjustably held on the rock-shaft 15 by means of a screw 20, such cam being on the same terminal with the cross-arm 18 and projecting over the elbow of the tube. Said cam is a part of the actuating mechanism, presently to be described, for a needle-valve 21. A straight link 22 connects the upper terminal of the cross-arm 18 with the crank 10, and an angular link 23 connects the lower terminal of said arm with the supplementary-air-valve arm 6. Although the cross-arm 18 describes an arc of a circle in a vertical plane and the arm 6 describes an arc of a circle in a horizontal plane, the connections between the link 23 and said cross-arm and between said link and said arm 6, especially the latter connection, are loose enough to accommodate the movements in both of said planes and so permit of the transmission of motion from the cross-arm to the arm 6.

It will now be seen how, when the arm 16 is actuated in the direction of the arrow in Fig. 4, the mechanism just described brings about the simultaneous opening of the throttle 8 and the supplementary air valve 5, the shaft 15 and its arm 18 being then rocked by said arm 16 in such a way as to throw outward the crank 10 through the medium of the link 22 on the one hand and to draw inward the head of the arm 6 on the other hand. The outward movement of the crank 10 rocks the shaft 9 and opens the throttle, and the inward movement of the head of the arm 6 or the coincidental partial rotation of said arm about the axis of the valve 5, which is permitted by the slot 7, brings the perforations in said valve into registry with the perforations in the diaphragm 3 and so opens the valve. Thus as the fuel is discharged from the mixing-chamber a fresh supply of air is admitted to said chamber, the amounts of both being relatively the same owing to the fact that the valve-actuating mechanism causes the two valves to act together and with the same relative speeds. Said valves are closed, when the arm 16 is returned to its former or initial position, by the same means as effected the opening of the same.

An elbow hood 24 is fastened by means of a nut 25 to the top of the supplementary-air branch of the tube 1, and in said hood is a valve or damper 26 tight on a shaft 27 mounted in said branch in a similar manner to the shaft 9. The ends of the shaft 27 extend beyond the hood 24 and upon one of these terminals an angular stop-dog 28 is secured, the range of movement of such dog being limited by a pin 29 projecting from said hood between the arms of the dog. A spring 30 is connected with the other terminal of the shaft 27 and is so arranged as to keep the damper open normally. The shaft 27 is rotated against the force of the spring 30 to constrict more or less with the damper the passage in which the latter is located, by means of a connection (not shown) with the long arm of the stop-dog 28. The damper is used as a primer for the air when the engine is first started, and is common to carbureters generally.

The needle-valve 21 in the vertical carbureter enters the mixing-chamber at an angle, but has its base or working end located directly in line with the center of the opening in the bottom of said chamber, although below such opening. In order to increase amount of gasolene which the needle-valve will admit to the mixing-chamber at such times as an increased amount is needed, it becomes necessary to provide some suitable means for actuating said valve further away from its seat so as to enlarge the outlet for the gasolene. Various devices for this purpose may be employed, but the mechanism described below has been found to be satisfactory. This mechanism also includes means for setting the needle-valve initially for the admission to the mixing-chamber of the minimum amount of gasolene, or the amount necessary when the engine is running at low speed or under what may be considered ordinary conditions. The aforesaid mechanism includes, with the needle-valve 21, the cam 19, and the means for actuating said cam, a stationary sleeve 31 which extends through an opening 32 in the top of the elbow of the tube 1 in the center transversely of said tube, but at one side of the longitudinal center thereof, and a head 33 on said sleeve that bears on that portion of said elbow that surrounds said opening and to which it is brazed or otherwise rigidly attached; a movable sleeve 34 in said first-mentioned sleeve, such movable sleeve being externally screw-threaded at the lower terminal to receive a nut 35, and a head 36 on said movable sleeve, said head 36 being internally screw-threaded to be engaged by a screw-threaded part 37 of the needle-valve spindle, which spindle extends through and beyond the sleeve 34 to locate the valve proper in the position already noted, and said head 36 being provided with a lip 38 which extends down over the outer end of the head 33, and having a transverse or lateral groove 39 in the bottom inside of said lip and a lateral slot 40 extending from the inner end of said head 36 to the screw-threaded opening therein for the needle-valve, which opening unites with said slot; an angular lifter 41, the short arm of which is flattened at 42 and enters the groove 39 with its flat part contiguous to the adjacent part of the head 33 below, and the long arm of which extends beneath the cam 19; a screw 43 which passes through the thin part of the head 36 above the slot 40, through the latter, and into threaded engagement with the thick part of said head 36 below said slot, and a spiral-spring 44 which encircles the sleeve 31 between the top of the mixing-chamber 2 and the nut 35. The office of the screw 43 is to slightly close the slot 40, after the needle-valve 21 has been properly adjusted initially by screwing it up or down in the head 36, and so cause the thin part of said head to bind on the screw-threads 37 and thus prevent said needle-valve from rotating or from being rotated until said screw is again loosened. The force of the spring 44 is constantly exerted to draw the head 36 down onto the short arm of the lifter 41, since the nut 35 against which the base of said spring bears is on the lower terminal of the sleeve 34 below the sleeve 31 while said head is on the top of said sleeve 34. By depressing the long arm of the lifter 41 the sleeve 34 is raised against the force of the spring 44, owing to the cam-like action of the flattened part 42 of said lifter on the head 33, and carries with it the needle-valve, and upon the release of the lifter the resiliency of said spring causes the parts to return to their former positions. This movement on the part of the needle-valve is comparatively slight, and there is ample clearance between the nut 35 and the inner or lower end of the sleeve 31 to permit such movement to take place. The amount of tension of the spring 44 is regulated by the nut 35. The lip 38, contacting as it does with the head 33, prevents the head 36 and its sleeve from turning. By loosening the screw 20 the cam 19 can be so adjusted on the shaft 15 as to act on the lifter 41 sooner or later; in the present arrangement said cam does not encounter said lifter until the former has completed nearly one-half of its stroke, but the setting might be such that there would be no lost motion between these members. A flat spring 45, having its outer end attached to the free protruding terminal of the short arm of the lifter 41 and its inner end resting on the tube, is provided to assist the spring 44 in returning said lifter to normal position with the cutaway part 42 flat on the head 33, after the lifter has been released by the cam 19 or to cause the lifter to follow said cam when the cam rises.

A flange 46 surrounds the elbow of the tube 1 and is provided with the usual bifurcated ears 47—47. An ordinary spring-retracted primer 48 is mounted in the flange 46 at one side of the elbow.

The lower carbureter section, which it may be noted in passing is common to both styles, is described as follows: A cylindrical receptacle 49, which forms a float-chamber 50, is provided and adapted to receive on its upper edge the flange 46 of the upper section, the two sections being fastened together in the usual manner by means of bolts 51—51 pivoted to lugs 52, and thumb-nuts 53—53 on said bolts above the ears 47. In the center of the float-chamber 50 is what is known as a constant tube 54 which forms the primary air inlet to the mixing-chamber 2, since said tube opens at the base below the floor of said chamber 50, at 55, and at the top into said chamber 2. The constant tube is of the Venturi variety on account of having a constricted area therein produced by means of an interior flange 56 a short distance from the top. In the center of the tube 54 is a spray nozzle 57 which opens at the top within the constricted area formed by the flange 56, and at the bottom into a lateral passage 58. The passage 58 has an upwardly-extending branch 59 which opens into the float-chamber 50 a little above the floor of said chamber. An overflow pan 60 is supported below the tube 54. This pan has to do with the priming operation which is well understood. The top of the nozzle 57 forms or constitutes the seat for the needle valve. An extension 61 on one side of the receptacle 49 has a vertical passage 62 therein which communicates with the float-chamber 50 through an opening 63, the bottom of such opening being on a level with the floor of said chamber. A nipple 64, having a valve-seat 65 at the top, is screwed into the bottom of the extension 61.

In practice, a supply pipe (not shown) leads from the nipple 64 to a tank or other container for gasolene. Within the passage 61 is a valve 66 which is capable of closing the valve-seat 65. This valve is provided with a guide 67 which extends downward into the nipple 64, and with a collar 68 on the spindle above. A rocker 69 is pivoted at 70 to a bracket 71 fastened to the floor of the float-chamber adjacent to the opening 63. Said rocker has two arms which pass through the opening 63 into the passage 62 beneath the collar 68, and two more arms in the float-chamber with projections 72 at their free ends that extend above and below such ends to support them on the floor of said chamber and to receive a float 73 which encircles the tube 54. A screw-cap 74 is provided to close the upper end of the passage 62 and to serve as a means for retaining a spring 75 in place and regulating the tension thereof. The spring 75 encircles the stem of the valve 66 between the collar 68 and the cap 74. The float 73, resting as it does on the long arms of the rocker 69, is heavy enough to overcome both the weight of the valve 66 with its appurtenances and the tension of the spring 75 and thus normally and automatically to open said valve and keep it open. While the valve 66 is open gasolene can flow from the nipple 64 through the valve-seat 65, the passage 62, and the opening 63 into the float-chamber 50, but as the fluid in the float-chamber rises it carries the float 73 upward and so brings about the automatic shutting off of the gasolene by said valve. These parts are old and their operation will be fully understood without further detailed description. When the fluid in the float-chamber rises to the top of the passage 59, said fluid overflows into the same, runs through the passage 58 and rises in the nozzle 57, at and from the upper end of which nozzle the constant, minimum rate of discharge of the fluid is maintained by the needle-valve 21, excepting at such times as said needle-valve is opened wider than normal through the medium of the lifter 41 and the cam 19, it being understood that while the screw 43 is loose the needle-valve is initially adjusted by hand by screwing it up or down in the head 36 to so position the working end of said valve relative to the upper end of said nozzle as to leave an opening for the escape of the fluid into the mixing-chamber in sufficient quantities only to supply the engine while operating under ordinary conditions, as has already been noted. This float and the fluid-supply-valve mechanism maintain the fluid at an approximately uniform level in the float-chamber 50.

Although the operation of the carbureter shown in Figs. 2, 3 and 5 is quite clear from the foregoing description, we will now briefly recapitulate and explain such operation as a whole, it being assumed that the proper connections with the gasolene supply and with the engine have been made.

To start the engine, first depress the float 73 by means of the primer 48 to cause the gasolene in the float-chamber 50 to overflow the nozzle 57 and descend in the tube 54 to the pan 60, the escape into said pan being through the opening 55. In this way an extra amount of gasolene is obtained for starting purposes. Next move the operating arm 16 and actuate the link mechanism to open the throttle 8 and the supplementary air valve 5. The result of this last action is that the gasolene in the pan 60 and with it a quantity of air are taken up through the opening 55 and the tube 54 into the mixing-chamber 2, and this mixture is carried on to the engine cylinder or cylinders, so that the engine can be started. The gasolene supply to the mixing-chamber from now on is obtained directly from the nozzle 57, and in some cases may be so obtained initially.

While ordinary conditions prevail the supplementary air valve 5 and the throttle 8 are only partially open, and the needle-valve 21 is left as originally set, but when more power is required the arm 16 is moved farther in the same direction as before, with the result that said valve 5 is opened wider to furnish more air, said needle-valve is opened wider, through the medium of the cam 19, the lifter 41 and the other co-acting parts, to permit a larger amount of gasolene to escape from the nozzle 57, and said throttle is opened wider to allow the resulting rich mixture of air and gasolene in the mixing-chamber to pass freely and abundantly to the engine.

To cut down the fluid supply to the minimum and decrease the supplementary air supply accordingly and at the same time restrict the volume of fuel to the engine, return the arm 16 part way to its starting point; and to shut off entirely the fuel supply and stop the engine, throw said arm clear over to initial position.

By using the constricted tube 54 and locating the discharge end of the nozzle 57 within the constricted area of such tube, a greatly improved mixture and most satisfactory results are obtained, because the effect produced by the Venturi construction on the air passing through the tube is utilized to the best advantage by discharging at the place we do the gasolene into the air.

To all intents and purposes the construction and operation of the horizontal carbureter shown in Fig. 7 are the same as the construction and operation of the vertical carbureter, but there are necessarily differences in detail between the two carbureters or between the upper sections of the two carbureters and these differences will be here explained. In the first place, the outlet arm or branch of the tube 1 takes a horizontal instead of a vertical direction and the throttle shaft 9 stands vertically instead of horizontally. This change in the shaft 9 calls for a vertical operating stud 76 to take the place of the shaft 15. The stud 76 is mounted to rotate in the top of the tube 1 and is connected with the throttle shaft and the supplementary-air-valve arm, 77, by the same number and substantially the same kind of members as are used in the other carbureter. The angular link, 23ª, has oppositely-directed offsets at the ends the planes of which are substantially parallel, instead of like the link 23 having offsets that are at right-angles to each other, but the functions of both are practically identical. The arm 77 is short, but might be long like the arm 6, or the latter might be short like the former. The needle-valve 21 stands vertically, and a lifter 78, having its flattened part 42 on the bottom of the short arm, is employed to raise said needle-valve when actuated by the cam 19 on the stud 76, back of the working edge of which cam the long arm of said lifter is positioned. Otherwise it is believed there is no change.

What we claim as our invention, and desire to secure by Letters Patent, is—

1. In a carbureter, a mixing-chamber having a fluid inlet, an air inlet, and a fuel outlet, a longitudinally-movable and normally non-rotary valve for said fluid inlet, a valve operating on a plane at right-angles to its axis for said air inlet, a valve the plane of which coincides with its axis for said fuel outlet, and means to operate said valves simultaneously.

2. In a carbureter, a mixing-chamber having a fluid inlet, an air inlet, and a fuel outlet, a longitudinally-movable and normally non-rotary valve for said fluid inlet, a valve operating on a plane at right-angles to its axis for said air inlet, a valve the plane of which coincides with its axis for said fuel outlet, and means to operate said valves simultaneously from a single point.

3. In a carbureter, a mixing-chamber having a fluid inlet, an air inlet, and a fuel outlet, a longitudinally-movable and normally non-rotary valve for said fluid inlet, a valve operating on a plane at right-angles to its axis for said air inlet, a valve the plane of which coincides with its axis for said fuel outlet, and means to operate the air inlet and fuel outlet valves simultaneously and to operate the fluid inlet valve with the others after their operation has commenced.

4. In a carbureter, a mixing-chamber having a fluid inlet, an air inlet, and a fuel outlet, a longitudinally-movable and normally non-rotary valve for said fluid inlet, a valve operating on a plane at right-angles to its axis for said air inlet, a valve the plane of which coincides with its axis for said fuel outlet, and means to operate from a single point the inlet and outlet valves simultaneously and to operate the fluid inlet valve with the others after their operation has commenced.

5. In a carbureter, a tube having one open end directed upwardly and provided with an elbow in which is a mixing-chamber below both ends of said tube, valves at or adjacent to the ends of such tube, a gasolene inlet opening into the base of such chamber, a valve for such gasolene inlet, and means to operate said valves simultaneously.

6. In a carbureter, a tube having one open end directed upwardly and provided with an elbow therein in which is a mixing-chamber below both ends of said tube, valves at or adjacent to the ends of such tube, a gasolene inlet opening into the base of such chamber, a valve for such gasolene inlet, and means to operate from a single point the valves which are at or adjacent to the ends of said tube and to operate the gasolene inlet valve with the others after their operation has commenced.

7. In a carbureter, a mixing-chamber provided with a longitudinally-movable and normally non-rotary fluid inlet valve, an air inlet valve operating on a plane at right-angles to its axis, and a fluid outlet valve the plane of which coincides with its axis, and mechanism for operating less than the whole number of said valves during the entire time that such mechanism is active and for operating all of said valves during a part of such time.

8. The combination, in a carbureter, with a throttle the plane of which coincides with its axis, and a supplementary air valve operating on a plane at right-angles to its axis, of a rocking member, a cross-arm on such member, and link connections between said cross-arm and said throttle and valve.

9. The combination, with the throttle, the supplementary air valve, and the needle valve, of a carbureter, such throttle and air valve being independent of each other and situated at points which are remote from each other, of a rocking member, a cross-arm on such member, link connections between such cross-arm and said throttle and air valve, and means operated from said rocking member for actuating said needle-valve.

10. The combination, with the throttle, the supplementary air valve, and the needle valve, of a carbureter, such throttle and air valve being independent of each other and situated at points which are remote from each other, of a rocking member, a cross-arm and a cam on such member, link connections between such cross-arm and said throttle and air valve, and means adapted to be operated by said cam to actuate said needle-valve.

11. The combination, in a carbureter, with the needle-valve, of a rocking member, a cam on such member, and a rocking cam provided with an arm which extends into the path of said first-mentioned cam, said second cam being arranged and adapted, when operated by said first cam, to actuate said needle-valve longitudinally without rotating the same.

12. The combination, with the throttle, the supplementary air valve, and the needle-valve, of a carbureter, such throttle and air valve being independent of each other and situated at points which are remote from each other, of a rocking member, a cross-arm and a cam on such member, link connections between said cross-arm and said throttle and air valve, and a lifter for such needle-valve arranged to be actuated by said cam and to actuate said needle-valve longitudinally without rotating the same.

13. The combination, in a carbureter, with the needle-valve, of a rocking member, a cam adjustably mounted on such member, and a rocking cam provided with an arm which extends into the path of said first-mentioned cam, said second cam being arranged and adapted, when operated by said first cam, to actuate said needle-valve longitudinally without rotating the same.

14. The combination, in a carbureter, of a mixing-chamber, a support for a lifter, a spring-pressed sleeve slidingly mounted in a wall of said mixing-chamber and provided with a head, a needle-valve engaged by such sleeve, and a lifter having a flattened arm to form a cam member between said support and said head with which to actuate said sleeve and needle-valve.

15. The combination, in a carbureter, of a mixing-chamber, a support for a lifter, a spring-pressed sleeve slidingly mounted in a wall of said mixing-chamber and provided with a head, a needle-valve in threaded engagement with such sleeve, and a lifter having a flattened arm to form a cam member between said support and said head with which to actuate said sleeve and needle-valve.

16. The combination, in a carbureter, with the mixing chamber, of a spring-pressed sleeve slidingly mounted in a wall of said mixing-chamber and provided with locking and releasing means for a needle-valve, a needle-valve in threaded engagement with such sleeve and subject to such locking and releasing means, and a lifter consisting in part of a cam, which is the axis of the lifter, arranged to actuate said sleeve and needle-valve.

17. The combination, in a carbureter, with the mixing-chamber, of an inwardly spring-pressed sleeve slidingly mounted in a wall of said mixing-chamber, a needle-valve engaging such sleeve, and a rocking spring-pressed lifter having a cam action on the sleeve and arranged, when actuated against the force of its spring, to actuate said sleeve and upon said needle-valve.

18. The combination, in a carbureter, with the mixing-chamber, of a fixed sleeve supported by one wall of said mixing-chamber, a support for a lifter at the outer end of said sleeve, a movable spring-pressed sleeve in said fixed sleeve, said movable sleeve having a head, a needle-valve in such movable sleeve and engaging the same, and a lifter having a cam member between said support and said head arranged to actuate the latter away from said support against the resiliency of the movable-sleeve spring.

19. The combination, in a carbureter, with the mixing-chamber, of a fixed sleeve supported by one wall of said mixing-chamber, a fixed member at the outer end of said sleeve, a movable spring-pressed sleeve in said fixed-sleeve, such movable sleeve having a head thereon with a lip which engages one side of said fixed member to prevent such movable sleeve from rotating, a needle-valve in such movable sleeve and engaging the same, and a lifter having a cam-action arranged to actuate said movable sleeve and needle-valve.

20. The combination, in a carbureter, of a mixing-chamber, a support for a lifter, a spring-pressed sleeve mounted in a wall of said mixing-chamber and having a head, a needle-valve engaging such sleeve and adjustable therein, and a lifter having a cam member between said support and said head arranged to actuate the latter away from the support against the resiliency of the sleeve spring.

21. In a carbureter, a mixing-chamber having a fluid inlet, an air inlet, and a fuel outlet, a longitudinally-movable valve for said fluid inlet, said valve being non-rotary except for adjustment, a valve operating on a plane at right-angles to its axis for said air inlet, a valve the plane of which coincides with its axis for said fuel outlet, and means to operate said valves simultaneously.

22. In a carbureter, the combination of a throttle, a shaft therefor, a supplementary air valve, a rocking member, a cross-arm on such member, link connections between said cross-arm and such throttle and valve, and means to regulate the movement of said throttle, such means consisting of a dog mounted on the throttle shaft and provided with an adjustable member, and a stop fixed in the path of such adjustable member.

FRANK W. SICKLES.
THOMAS D. MILLEA.
MICHAEL J. CARROLL.

Witnesses:
F. A. CUTTER,
A. C. FAIRBANKS.